United States Patent [19]
Silver

[11] Patent Number: 5,906,230
[45] Date of Patent: May 25, 1999

[54] VERSATILE LATHE CHUCK

[76] Inventor: Harry Silver, 1844 Meadowbrook Rd., Abington, Pa. 19001

[21] Appl. No.: 09/048,345

[22] Filed: Mar. 26, 1998

[51] Int. Cl.⁶ .............................. B27C 7/04; B23B 23/00
[52] U.S. Cl. ................................. 142/53; 82/150
[58] Field of Search .................. 142/53; 82/150

[56] References Cited

U.S. PATENT DOCUMENTS

| | | | |
|---|---|---|---|
| 268,393 | 12/1882 | Evans | 142/53 |
| 309,288 | 12/1884 | Birkman . | |
| 1,198,030 | 9/1916 | Helgerud | 142/53 |
| 1,246,697 | 11/1917 | Archer . | |
| 2,313,963 | 3/1943 | Patrick . | |
| 4,667,549 | 5/1987 | Griffin | 142/53 |

FOREIGN PATENT DOCUMENTS 788318  12/1957  United Kingdom ..................... 142/53

*Primary Examiner*—Steven C. Bishop
*Attorney, Agent, or Firm*—Paul Lipsitz

[57] ABSTRACT

A versatile lathe chuck characterized by a chuck body threaded on the inside for attachment to a lathe spindle and to receive at its work-turning end a variety of fittings and further characterized by a jam or locking screw which threads into the inside of the chuck to lock the insert in place.

5 Claims, 2 Drawing Sheets

VERSATILE LATHE CHUCK

This invention relates to an improved lathe chuck characterized by having a variety of fittings adapted for different work pieces. The improved chuck is simple to manufacture and is very easy to use.

BACKGROUND OF THE INVENTION

In the use of a wood or metal lathe the work pieces vary in size and substance and often require different types of chucks to hold the work. This makes it necessary to have a large variety of chuck inserts on hand and special chucks must often be made for particular types of work. This invention provides a chuck which is versatile in that it is adaptable for different work pieces, is very easy to use, and is simple and inexpensive to manufacture.

BRIEF STATEMENT OF THE INVENTION

This invention embodies a versatile lathe chuck characterized by a chuck body threaded on the inside for attachment to a lathe spindle and to receive at its work-turning end a variety of fittings adapted for the work involved, and further characterized by a jam or locking screw which threads into the inside of the chuck to lock the insert in place.

DISCUSSION OF THE PRIOR ART

U.S. Pat. No. 1,246,697 discloses an attachment to lathes for centering and driving the work and also provides means to protect the hands, protect the work driving means, and provide means to cause the driving member to recede in the event of any overfeed of a self-feeding tool. The lathe attachment has an internally threaded body for attachment to the lathe spindle and a work driving piece is inserted through a tapered clamping member. Thus, this attachment requires a plurality of complex parts and is difficult to make and to use.

U.S. Pat. No. 2,313,963 discloses a tapered shank adapted to fit into an opening in the tail stock of a lathe. The tapered shank rotates on ball bearings which require a lubricant for proper operation. The tool provides for an adapter which may receive one of a plurality of work receiving tools. Because of the ball bearings required, this tool is complex and expensive.

U.S. Pat. No. 309,288 discloses a lathe chuck having socket adapters to take different sized drills or shafts. The socket adapters comprise various concentric sockets which fit into a conical sleeve whereby the sockets hold shanks of different sized shafts.

THE DRAWINGS

DETAILED DESCRIPTION OF THE INVENTION

Figure 1:
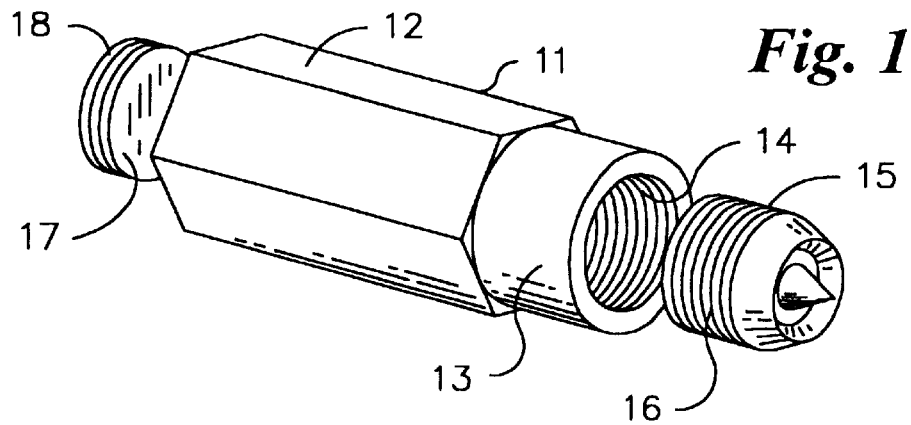
FIG. 1 is a perspective view of the lathe chuck with a work holding insert and jam screw.
Figure 2:
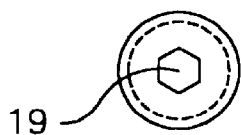
FIG. 2 is an end view of the jam screw.
Figure 9:
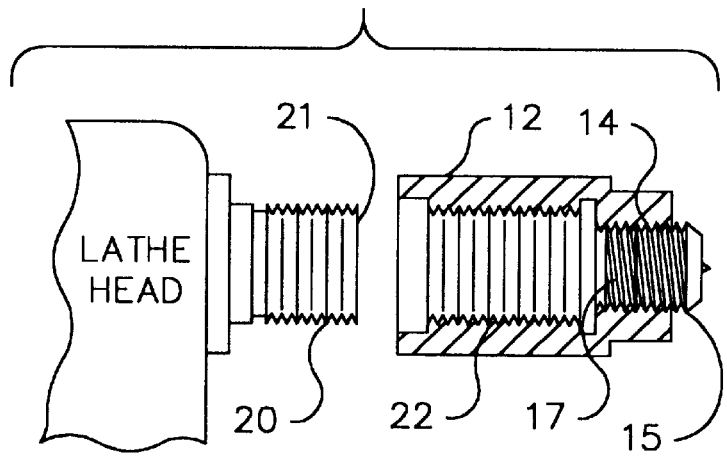
FIG. 9 is a side view showing the jam screw in use.

Referring to FIG. 1, the lathe chuck of the invention comprises a master chuck section, shown generally as 11, having, preferably, a hexagonal body section 12 and a forward portion 13. Although the forward portion of the chuck 13 is shown as cylindrical, it may also be hexagonal or of any other appropriate configuration. The chuck 11 has an internal longitudinal thread 14 which may be of the same diameter throughout or may be of different diameters in the front and rear sections of the chuck. All that is required is that the thread of the front section of the chuck be adapted to take a work-holding insert 15 having the appropriate thread 16 for engaging thread 14 and that the rear section thread of the chuck be adapted to fit onto a lathe head spindle nose as shown in FIG. 9. A locking screw or jam screw 17 has a thread 18 to fit an internal thread 14 of the chuck. The jam screw has a drive hole at one end as shown in FIG. 2 where the drive hole 19 is shown configured for an alien wrench. After the insert 15 is screwed into the chuck 11 to the desired distance, the jam screw 17 is screwed into the rear end of the chuck until it backs against insert 15. By tightening the jam screw against insert 15, the insert is locked in place and prevented from loosening or shifting in any way. It will be understood that, when the thread 14 is not of uniform diameter through chuck 11, the jam screw may operate with a thread diameter fitting the font or rear end thread of the chuck. Thus, when the diameter of the jam screw is the same as that of the insert 15, the jam screw may be screwed in from the front or back of the chuck. Thus, the jam screw may be inserted first and then the insert placed in the chuck. If the diameter of the thread in the rear section of the chuck is larger than that of the insert, the insert is inserted to extend to or beyond the end of the chuck's front end thread and the jam screw inserted from the rear and locked in place against the insert. The jam screw is preferably quite thin having only about two or three threads. After the master chuck 11 is fitted with the locked insert, its open end is threaded onto the lathe spindle and the lathe is ready for subsequent operations. The jam screw may have a variety of drive holes for an appropriate tool to tighten the screw against the insert such as an allen wrench as shown in FIG. 2, a slot or phillips screw driver or other configuration. It will be understood that the wrench socket may extend part way or all the way through the jam screw.

Figure 3:
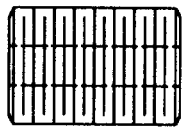
FIGS. 3 through 8 are side views to illustrate various types of inserts used for the work.

FIG. 3 shows an insert useful for an arbor chuck.

Figure 4:
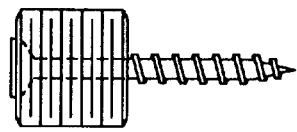

FIG. 4 shows an insert for a wood screw to hold the work.

Figure 5:
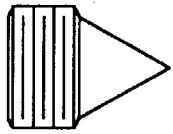

FIG. 5 is an insert useful for a balance chuck.

Figure 6:
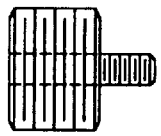

FIG. 6 is an insert useful for a threaded drive chuck.

Figure 7:
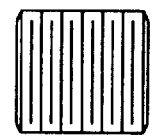

FIG. 7 is a plain blank-faced insert for a face plate holder which is used for a free spinning work piece to turn a bowl, for example.

Figure 8:
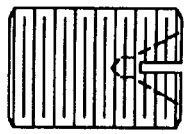

FIG. 8 is an insert useful for a piece of wood having a square cross-section.

Figure 10:
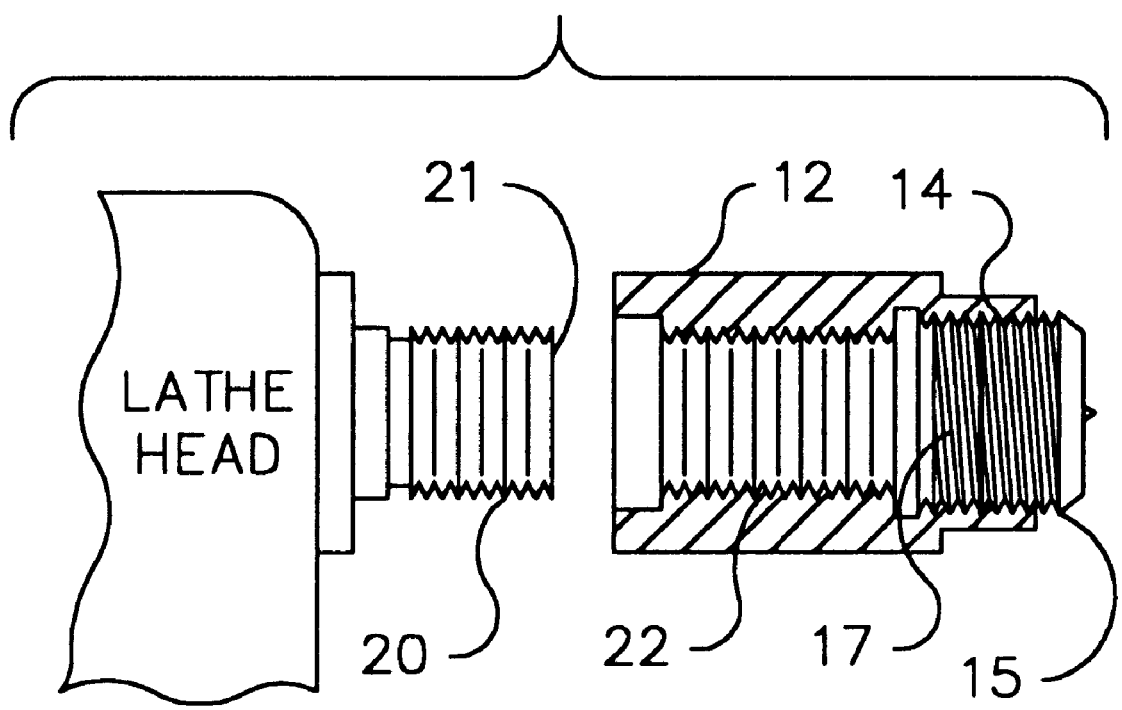
FIG. 10 is an alternate embodiment of the lathe chuck.

It will be understood that the thread on the chuck for receiving the insert may be different from that for mounting on the lathe spindle and one embodiment of this difference is shown in detail in FIG. 9. As shown in FIG. 9, insert 15 is threaded into thread 14 on chuck 12 and a jam screw 17 is tightened against the insert. Thread 20 which is on the lathe head spindle nose 21 fits into thread 22 on chuck 12 for putting the chuck on the spindle nose. It will be noted in FIG. 9 that the diameter and thread of the jam screw 17 is configured to fit into the threaded front section of the chuck and that the diameter of the threaded section 22 of the chuck which fits onto the spindle is larger than the thread 17 of the front section. In another embodiment (FIG. 10), the front end of the chuck 12 has a thread diameter larger than the rear diameter of the chuck which fits onto the spindle nose. In such an embodiment, the jam screw 17 is screwed into the rear of the front section of the chuck, the insert 15 then put in place and with an appropriate tool reaching from the rear of the chuck, the jam screw is tightened against the insert. The chuck with the fixed-in-place insert is then ready to be screwed onto the spindle nose. These options provide adaptability of the chuck to various requirements that may arise in use.

In addition to the advantage of providing a chuck adaptable for receiving a variety of different work pieces, the invention allows the adjustment of thread depth for the insert in the chuck. Thus, extension of the work-holding insert may need to be different for various types of work and the insert may be screwed into the chuck to provide an appropriate extension length and locked with the jam screw. Such versatility has not been available heretofore with conventional chucks.

I claim:

1. A lathe chuck adapted for threaded attachment to a lathe spindle and to receive a variety of work-turning fittings comprising in combination, a master chuck section having a longitudinal thread, a threaded insert fitting an internal thread in a front section of said chuck, said insert fitting being adapted for turning the work, and a threaded jam screw screwed into said chuck to back against said insert and tightened against the back of said insert to lock said insert in place.

2. The lathe chuck of claim 1 wherein the body of said chuck is hexagonal.

3. The lathe chuck of claim 1 wherein the internal longitudinal thread diameter for said insert is different from the thread diameter for attachment to said spindle.

4. The lathe chuck of claim 1 wherein the internal longitudinal thread diameter for said insert is smaller than the thread diameter for attachment to said spindle.

5. The lathe chuck of claim 1 wherein the internal longitudinal thread diameter for said insert is larger than the thread diameter for attachment to said spindle.

* * * * *